Feb. 18, 1941.   G. G. McNAMARA   2,232,549
TRUCK CONSTRUCTION
Filed Oct. 21, 1938   2 Sheets-Sheet 1

Inventor
Gordon G. McNamara
By V. F. Lavagne
Atty

Feb. 18, 1941.  G. G. McNAMARA  2,232,549
TRUCK CONSTRUCTION
Filed Oct. 21, 1938   2 Sheets-Sheet 2

Inventor
Gordon G. McNamara
By I. F. Lausagne
Atty

Patented Feb. 18, 1941

2,232,549

UNITED STATES PATENT OFFICE 2,232,549

TRUCK CONSTRUCTION

Gordon G. McNamara, Chicago, Ill., assignor to International Harvester Company, a corporation of New Jersey Application October 21, 1938, Serial No. 236,268

2 Claims. (Cl. 280—111)

This invention relates to a truck construction for land vehicles. More particularly it relates to an arrangement for supporting a load-carrying frame on a wheel-supported axle.

In certain types of farm machines, it is customary to support the frame of a machine at one central point on an axle so that a certain amount of lateral pivoting may take place between the frame and the axle. In such a case, the support is usually through a pin upon which the wear is great because of the small bearing surface and the main object of the present invention is to avoid such wear and generally to provide an improved truck construction.

Another object is the provision of an improved pivotal support of a load-carrying frame upon an axle.

According to the present invention, a load-carrying frame is carried upon a wheel-supported axle through the medium of semi-cylindrical members secured to the frame and to the axle. Pivoting between the axle and the frame is attended by a relative movement between the cylindrical surfaces of the members.

Figure 1:
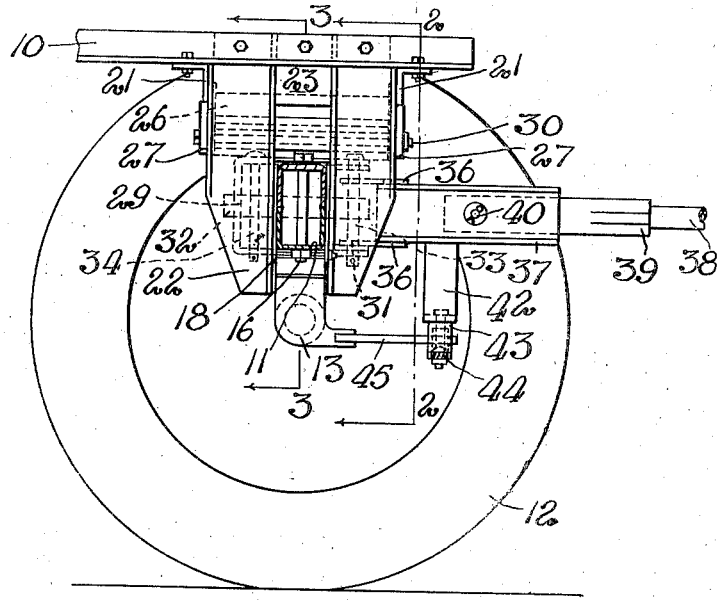
Figure 1 is a sectional view in elevation showing the improved truck construction.
Figure 2:
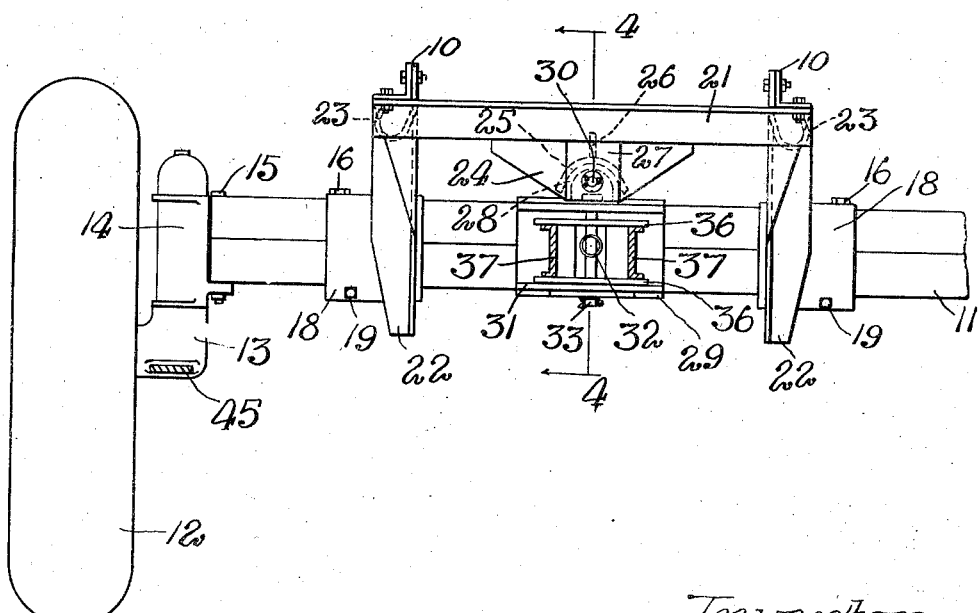
Figure 2 is a sectional view taken along the lines 2—2 of Figure 1.
Figure 4:
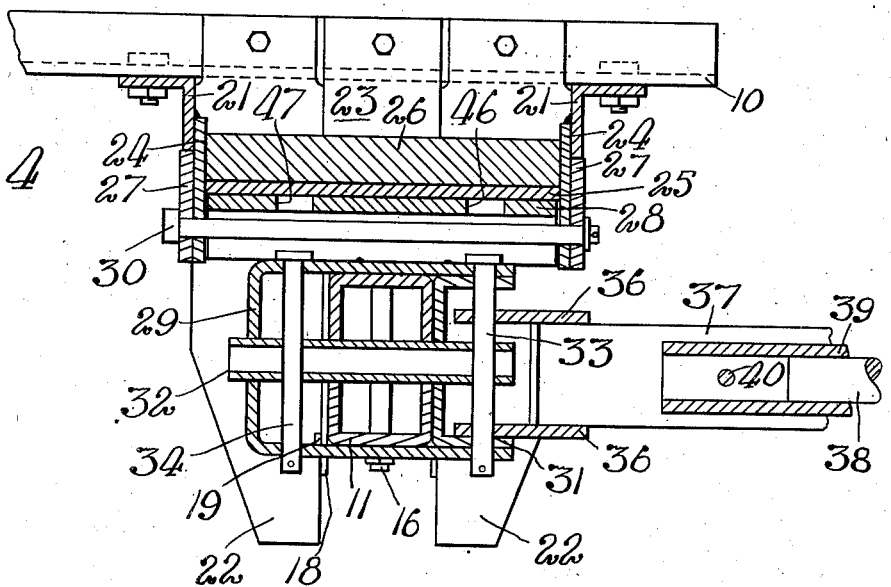
Figure 4 is a sectional view taken along the lines 4—4 of Figure 2.
Figure 3:
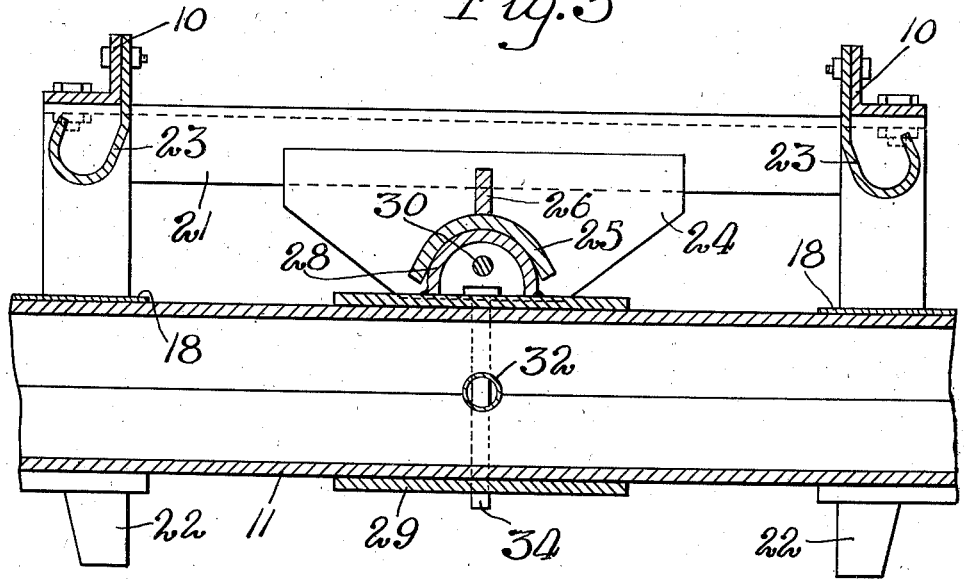
Figure 3 is a sectional view taken along the lines 3—3 of Figure 1.

The numeral 10 designates angle members which form part of the frame supporting a machine which is not shown since it forms no part of the present invention. Positioned below the members 10 is an axle 11 preferably formed of channel-shaped halves welded together. At each end of the axle, only one of which is shown, is a wheel 12 which supports the axle through the medium of a spindle member 13 journaled in a spindle bearing 14 extending into and secured to the axle by means of bolts 15 and 16 extending through the axle. The bolts 16 also serve to secure U-shaped shields 18. Bolts 19 also retain the shields in place, passing through the shields and beneath the axle 11.

Angle members 21 extend in spaced relation to one another between angle members 10. Between the members 21 are channeled guide members 22 which are secured to angle members 10 and contact the shields 18 on the front and rear sides of the axle 11. Spacer members 23 are secured to the angle members 10 between the guide members 22. Plates 24 are secured to members 21 and to the plates are secured a semi-cylindrical part 25 and a reenforcing piece 26 above the part 25. Reenforcing pieces 27 are secured to the plates 24.

A semi-cylindrical member 28 is in engagement with the part 25 and is secured to the upper surface of a U-shaped member 29 embracing the upper and lower surfaces of the axle 11. A pin 30 extends through plates 24 and 27 and between members 28 and 29. A channel 31 is secured within the member 29 and to the axle 11. A short section of pipe 32 extends through the U-shaped member 29, axle 11 and channel 31, and retaining bolts 33 and 34 pass through it and member 29 and channel 31. Bolt 33 passes through plates 36 held in spaced relation by means of channel elements 37. A steering rod 38 is embraced by members 39 and is pivotally attached to the elements 37 by means of a bolt 40.

A member 42 depends from elements 37 and is secured by a part 43 to a tie rod 44. The tie rod is connected to each wheel 12 by means of a steering link 45.

It will be seen that with the arrangement described, the body of the machine supported on angle members 10 is supported on the axle 11 at a central point and that a lateral pivotal movement between the frame and the axle is made possible. The load is transmitted through the semi-cylindrical members 25 and 28 which contact over a considerable area. Consequently, any wear because of relative movement between these members in pivoting is small because the contact area is large. This is a considerable improvement over the arrangement where support is effected through a horizontal pin.

In such a case, the contact area would be small and the wear relatively great. The members 25 and 28 are held in contact by means of the pin 30. Holes 46 and 47 are provided in member 28 to permit the removal of bolts 33 and 34.

It is apparent from the foregoing description that a novel truck construction has been provided and the intention is to limit the invention only within the scope of the appended claims.

What is claimed is:

1. A truck construction comprising an axle, a frame positioned over the axle, a U-shaped member embracing the upper and lower surfaces of the central portion of the axle and extending beyond the side surfaces thereof, draft means connected to the forward ends of said U-shaped member, a convex semi-cylindrical member with its axis extending transversely of the axle secured to the U-shaped member, spaced plates secured to the frame, a concave semi-cylindrical member with its axis extending transversely of the axle secured between said plates and contacting the convex member, and a pin passing through said plates on the frame and said convex member.

2. A truck construction comprising an axle, a frame positioned over the axle, guide means depending from the frame and contacting opposite sides of the axle, a U-shaped member embracing the upper and lower portion of the axle and extending beyond the side surfaces thereof, draft means connected to the forward ends of said U-shaped member, a convex semi-cylindrical member with its axis extending transversely of the axle secured to the U-shaped member and extending beyond the side surface thereof, spaced plates secured to the frame, a concave semi-cylindrical member with its axis extending transversely of the axle secured between said plates and contacting said convex member, and a pin passing through said plates and said convex member.

GORDON G. McNAMARA.